(12) United States Patent
Oliphant et al.

(10) Patent No.: US 11,624,373 B2
(45) Date of Patent: *Apr. 11, 2023

(54) METHODS AND SYSTEMS FOR COOLING A PRESSURIZED FLUID WITH A REDUCED-PRESSURE FLUID

(71) Applicant: Concepts NREC, LLC, White River Junction, VT (US)

(72) Inventors: Kerry N. Oliphant, Sandy, UT (US); Francis A. Di Bella, Boston, MA (US)

(73) Assignee: Concepts NREC, LLC, White River Junction, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,610

(22) Filed: Apr. 1, 2022

(65) Prior Publication Data
US 2022/0220977 A1 Jul. 14, 2022

Related U.S. Application Data

(60) Continuation of application No. 16/817,022, filed on Mar. 12, 2020, now Pat. No. 11,306,738, which is a
(Continued)

(51) Int. Cl.
| | |
|---|---|
| *F04D 29/58* | (2006.01) |
| *F04D 13/04* | (2006.01) |
| *F01D 15/08* | (2006.01) |
| *F04D 25/04* | (2006.01) |
| *F25J 1/02* | (2006.01) |
| *F15B 21/042* | (2019.01) |

(Continued)

(52) U.S. Cl.
CPC ......... *F04D 29/5866* (2013.01); *F01D 15/08* (2013.01); *F04D 13/043* (2013.01); *F04D 25/045* (2013.01); *F04D 29/5826* (2013.01); *F15B 21/042* (2013.01); *F25J 1/0288* (2013.01); *F04D 15/0005* (2013.01); *F04D 27/006* (2013.01); *F05D 2260/211* (2013.01); *F28D 2021/004* (2013.01); *F28D 2021/0026* (2013.01); *Y02T 50/60* (2013.01)

(58) Field of Classification Search
CPC ............ F04D 29/5866; F04D 29/5826; F04D 15/0005; F04D 27/006; F15B 21/042; F25J 1/0288; F01D 15/08; F28D 2021/0026; F28D 2021/004; F05D 2260/211
See application file for complete search history.

(56) References Cited

U.S. PATENT DOCUMENTS

| | | | | |
|---|---|---|---|---|
| 4,218,191 A | * | 8/1980 | Stewart | ................ G05D 16/208 417/19 |
| 4,481,125 A | * | 11/1984 | Holgado | .............. C10M 145/36 252/75 |

(Continued)

*Primary Examiner* — Kenneth J Hansen
*Assistant Examiner* — David N Brandt
(74) *Attorney, Agent, or Firm* — Downs Rachlin Martin PLLC

(57) ABSTRACT

Systems and methods for reducing the pressure of a first pressurized fluid, thereby reducing the temperature of the pressurized fluid, and utilization of the reduced-pressure and temperature fluid to cool a second fluid. Such an approach can enable a reduction in the size and weight of a hydraulic system, utilize waste energy in a system, and/or minimize electrical power requirements of a system, among other benefits.

17 Claims, 5 Drawing Sheets

Related U.S. Application Data division of application No. 15/288,163, filed on Oct. 7, 2016, now Pat. No. 10,590,959.

(60) Provisional application No. 62/239,640, filed on Oct. 9, 2015.

(51) Int. Cl.
*F04D 27/00* (2006.01)
*F04D 15/00* (2006.01)
*F28D 21/00* (2006.01)

(56) References Cited

U.S. PATENT DOCUMENTS

| | | | |
|---|---|---|---|
| 2003/0074900 A1* | 4/2003 | McFarland | F02C 1/10 60/645 |
| 2003/0228232 A1* | 12/2003 | Cowans | F04D 13/06 417/366 |
| 2010/0021284 A1* | 1/2010 | Watson | F02C 6/14 126/400 |
| 2016/0054071 A1* | 2/2016 | Cordova | F28F 7/02 165/164 |
| 2017/0314419 A1* | 11/2017 | Bowan | F04D 13/04 |

* cited by examiner

METHODS AND SYSTEMS FOR COOLING A PRESSURIZED FLUID WITH A REDUCED-PRESSURE FLUID

RELATED APPLICATION DATA

This application is a continuation of U.S. patent application Ser. No. 16/817,022, filed Mar. 12, 2020, titled "Methods and Systems For Cooling A Pressurized Fluid With A Reduced-Pressure Fluid," now allowed, which is a divisional of U.S. patent application Ser. No. 15/288,163, filed Oct. 7, 2016, titled "Methods and Systems For Cooling A Pressurized Fluid With A Reduced-Pressure Fluid," now U.S. Pat. No. 10,590,959, which application claims the benefit of priority of U.S. Provisional Patent Application Ser. No. 62/239,640, filed Oct. 9, 2015, and titled "Turbo-Pump System With Controls and Cooling of Hydraulic Accumulator," each of which is incorporated by reference herein in its entirety.

FIELD OF THE INVENTION

The present invention generally relates to the field of cooling a pressurized fluid. In particular, the present invention is directed to methods and systems for cooling a pressurized fluid with a reduced-pressure fluid.

BACKGROUND

When pressurizing a fluid, whether a liquid or gas, cooling is often desirable, or required. For example, in the case of compressing a gas, it is common to cool the gas upstream of a compressor inlet to increase efficiency, or, in the case of multiple-stage compressors, cooling the gas between one or more of the stages. In the case of pumping a liquid, cooling can be required to maintain the liquid below a maximum allowable temperature. For example, in a hydraulic drive system, hydraulic fluid often must be maintained below a certain temperature to avoid overheating the fluid and degrading hydraulic performance and/or possibly causing the hydraulic fluid to decompose. Cooling can also be desirable in liquid pumping and gas compression applications for other reasons, such as the need to maintain thermal equilibrium of both hot and cold fluids or to maintain system fluids below any maximum allowable operating temperatures for system components.

SUMMARY OF THE DISCLOSURE

In one implementation, the present disclosure is directed to a pumping system. The pumping system includes a turbine mechanically coupled to a pump, the turbine having an outlet; and a heat exchanger fluidly coupled to the turbine downstream of the outlet and fluidly coupled to the pump, the heat exchanger configured to provide heat transfer between a working fluid exhausted from the turbine outlet and a liquid being pumped by the pump to cool the liquid being pumped.

In another implementation, the present disclosure is directed to a mechanical system for a mobile apparatus. The mechanical system includes a pressurized gas system; a hydraulic circuit including at least one load; and a pumping system, wherein a pressurized gas from the pressurized gas system is the turbine working fluid, the pump being configured to pressurize a hydraulic fluid in the hydraulic circuit.

In another implementation, the present disclosure is directed to a system. The system includes an expander for expanding a first fluid, the expander having an outlet; a pump or compressor for pressurizing a second fluid; and at least one heat exchanger, the at least one heat exchanger fluidly coupled to the expander downstream of the outlet and fluidly coupled to the pump or compressor for providing heat transfer between the first and second fluid.

In another implementation, the present disclosure is directed to a method of pressurizing a fluid. The method includes providing a pump or compressor for pressurizing the fluid; providing an expander; and placing the fluid in thermal communication with an exhaust from the expander to reduce a temperature of the fluid.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure includes systems and methods for reducing the pressure of a first pressurized fluid, thereby reducing the temperature of the pressurized fluid, and then using the reduced pressure and temperature fluid to cool a second fluid. As described more below, such an approach can enable a reduction in the size and weight of a hydraulic system, utilize waste energy in a system, and/or minimize electrical power requirements of a system, among other benefits.

Figure 1:
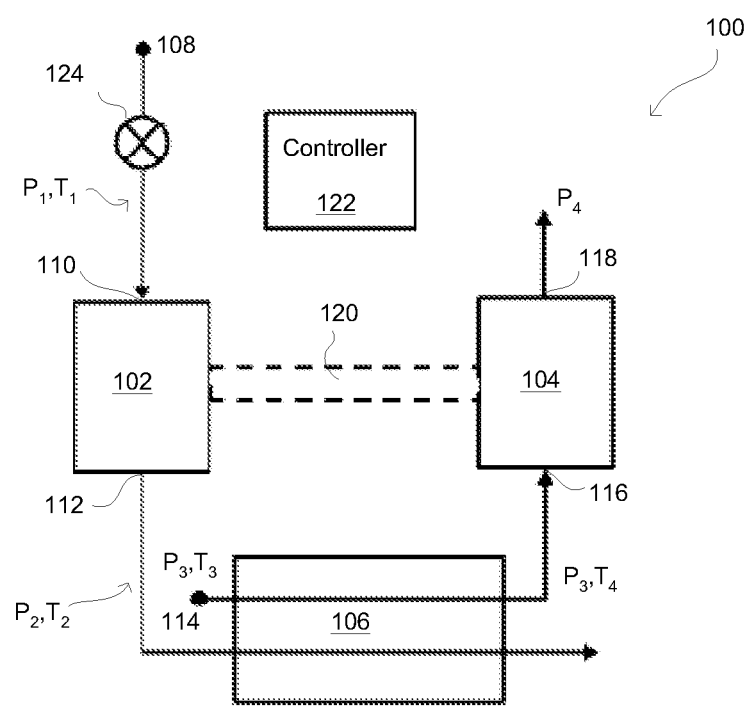
FIG. 1 is a diagram of an exemplary system made in accordance with the present disclosure.

FIG. 1 is a diagram of an exemplary system 100 made in accordance with the present disclosure. System 100 includes an expander 102, pump/compressor 104, and heat exchanger 106. Expander 102 is configured to receive a first fluid 108 having a temperature T1 and pressure P1 at expander inlet 110 and expand the fluid to a lower temperature T2 and pressure P2 at expander outlet 112. Pump/compressor 104 is configured to pressurize a second fluid 114 from a first pressure P3 at inlet 116 to a second, higher pressure P4 at outlet 118. Prior to pressurization, heat exchanger 106 places the first fluid 108 downstream of expander outlet 112 in thermal communication with second fluid 114 upstream of pump/compressor inlet 116 to thereby reduce the temperature of second fluid 114, from temperature T3 to temperature T4, prior to pressurization. In another embodiment, heat exchanger 106 can place second fluid 114 downstream of pump/compressor outlet 118 in thermal communication with first fluid 108 to cool second fluid 114 after being pressurized by pump/compressor 104. System 100 can include one or more heat exchangers 106, and each heat exchanger can have any configuration known in the art, including parallel or counter flow single or multiple pass shell and tube, plate, plate and shell, plate fin, microchannel heat exchangers, among others.

First fluid 108 can be a liquid or gas, and expander 102 can be any of a variety of expanders known in the art. For example, expander 102 can include one or more of a nozzle and/or turbine. As is known in the art, the expansion of a fluid can result in a reduction in both the temperature and pressure of the fluid, for example, as a result of a drop in total enthalpy and/or the Joule-Thompson effect. System 100 utilizes the reduced temperature resulting from the expansion of fluid 108 through expander 102 to cool second fluid 114. Second fluid 114 can similarly be a liquid or gas, depending on the specific configuration and application of system 100. In embodiments where second fluid 114 is a liquid, pump/compressor 104 can include at least one pump and when the second fluid is a gas, the pump/compressor can include at least one compressor. System 100 can also optionally include a mechanical coupling 120, such as a shaft, for mechanically coupling expander 102 and pump/compressor 104, such as in a turbo-pump or turbo-compressor arrangement, where energy extracted from first fluid 108 by expander 102 can be used to power pump/compressor 104. Non-limiting examples of first fluid 108 include air, hydrogen, natural gas, methane, carbon dioxide, or any other pressurized vapor, or any type of liquid. Non-limiting examples of second fluid 114 can include any type of hydraulic fluid, such as water, mineral oil, natural oil, such as rapeseed or canola oil, glycol, esters, organophosphate ester, polyalphaolefin, propylene glycol, and silicone oils. Other examples of second fluid 114 include air, hydrogen, methane, natural gas, or any other type of liquid or gas.

In the illustrated example, expander 102 is a non-combustion component, such that there is no combustion process within expander 102 for heating first fluid 108. Instead, a temperature of first fluid 108 and be substantially reduced during expansion through expander 102, thereby providing a relatively cold fluid useful for extracting thermal energy from second fluid 114. As shown in FIG. 1, system 100 may also include a controller 122 for monitoring one or more operating conditions of the system and controlling a state of one or more components in the system, such as a control valve 124 located upstream of expander inlet 110. For example, in the case of a turbo-pump or turbo-compressor arrangement, controller 122 may monitor the operating parameters of expander 102 and pump/compressor 104 and adjust a position of control valve 124 to increase or decrease a power output of expander 102 to maintain a desired pressure at pump/compressor outlet 118.

FIGS. 2-6 show an example system 200, which is an application of system 100, applied to a hydraulic drive system. System 200 includes turbo-pump 202 and heat exchanger 204/204' operably coupled to hydraulic circuit 206. Turbo-pump 202 includes an axial turbine 208 mechanically coupled to a centrifugal pump 210 and is configured to power the pump for pressurizing a hydraulic fluid 212 in hydraulic circuit 206. In the illustrated example, turbine 208 is a non-combustion turbine, such that there is no combustion process within the turbine for heating gas 214. Instead, a temperature of gas 214 can be substantially reduced during expansion through turbine 208, thereby providing a relatively cold gas useful for extracting thermal energy from fluid 212.

In other embodiments, any of a variety of different pump and turbine designs other than the specific one illustrated herein may be used. For ease of comparison with system 100 (FIG. 1), turbine 208 corresponds to expander 102, pump 210 corresponds to pump/compressor 104, and heat exchanger 204/204' corresponds to heat exchanger 106. In the example shown in FIG. 2, a pressurized gas 214 having a pressure P1 and temperature T1 is in fluid communication with an inlet 216 of turbine 208. System 200 includes a control valve 218 for controlling the pressure and flow rate of pressurized gas 214 at inlet 216, to thereby control a power output of turbine 208. Gas 214 is then exhausted from turbine 208 at a turbine outlet 220, at a lower temperature T2 than temperature T1 and a lower pressure P2 than pressure P1, due to known thermodynamic effects associated with a reduction in the energy or enthalpy state of the gas and/or the Joule-Thompson effect. Pump 210 is configured to pressurize hydraulic fluid 212 for hydraulic circuit 206 and is in fluid communication with the circuit at pump inlet 222 and pump outlet 224.

Hydraulic circuit 206 can have any configuration known in the art. In the illustrated example, hydraulic circuit 206 has a closed-loop configuration and includes a high-pressure reservoir 230 for receiving and accumulating pressurized hydraulic fluid 212 from pump outlet 224 and providing the pressurized fluid to one or more loads 232 in the circuit. Loads 232 can be any hydraulic circuit load known in the art, such as a hydraulic pump, hydraulic actuator, hydraulic cylinder, etc. Circuit 206 also includes a low pressure reservoir 234 for collecting hydraulic fluid 212 and placing the hydraulic fluid in fluid communication with pump inlet 222 for pressurization. In other examples, turbo-pump 202 may be utilized with any other hydraulic circuit configuration, including a circuit having an open loop configuration, and/or that has more or less than two reservoirs, etc.

Figure 2:
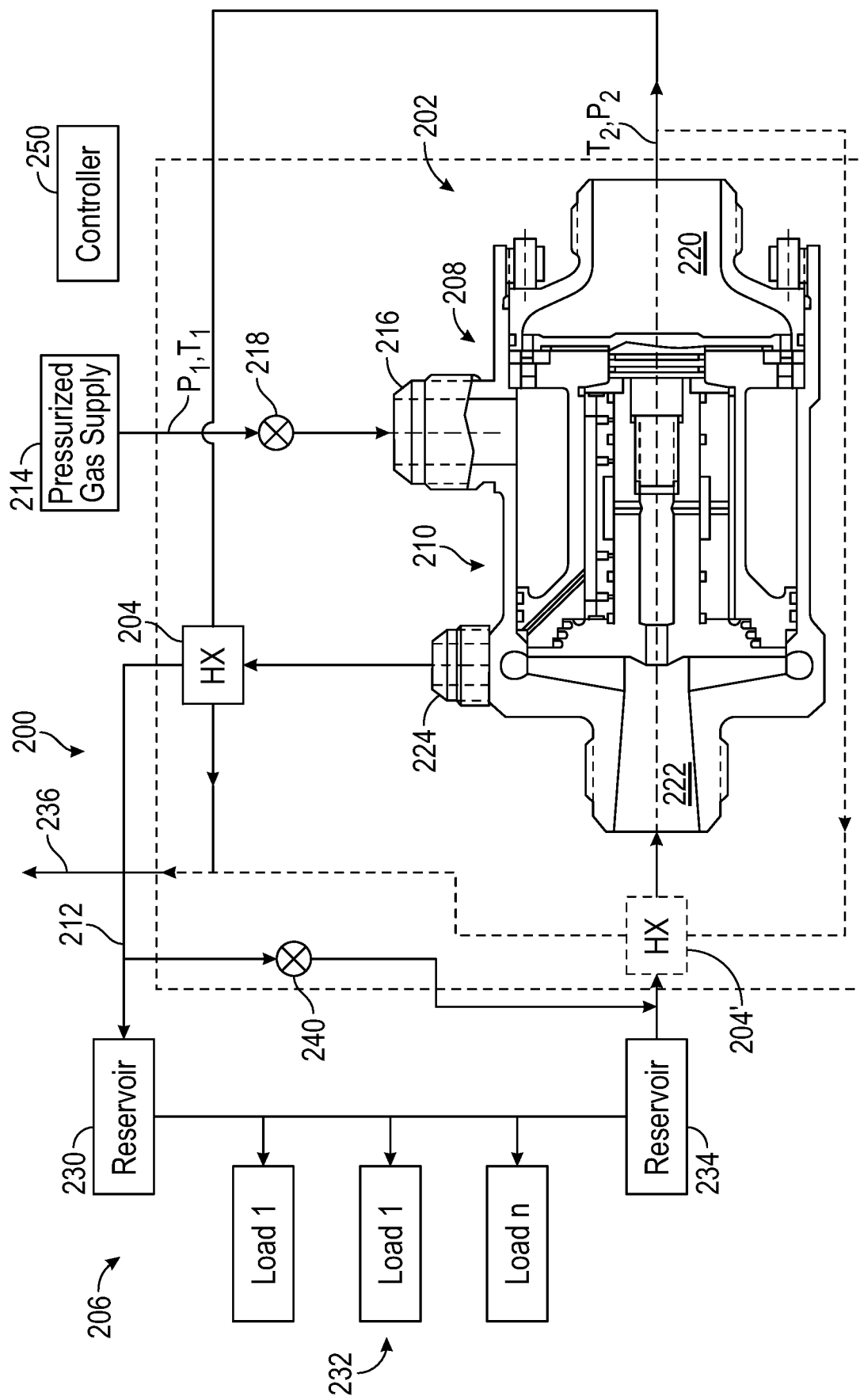
FIG. 2 is a diagram of an exemplary turbo-pump and hydraulic circuit.

For proper functioning of hydraulic circuit 206, hydraulic fluid 212 must be maintained below a maximum allowable temperature. For example, depending on the specifics of the particular type of hydraulic fluid 212 and the temperature ratings of components within hydraulic circuit 206, exceeding a maximum allowable temperature may result in damage or failure of various components in the hydraulic circuit, such as one or more of loads 232. For some types of hydraulic fluids 212, exceeding a maximum allowable temperature could also cause decomposition of the fluid, which can include a chemical change to the fluid, and may result in coking of the fluid and subsequent coating of interior surfaces of downstream piping and components, the formation of acidic constituents that may corrode piping and other materials, and the modification of thermo-physical fluid properties such as density, viscosity, etc., that could affect the efficacy of pump 210. Modification of thermo-physical fluid properties of fluid 212 could also impact the performance of any components, such as loads 232 downstream of pump 210 that require a particular hydraulic fluid specification, including a limit of operational temperature. Pump 210 and other components in circuit 206 may, however, add heat to fluid 212 that must be extracted in some way to maintain the fluid below the maximum allowable temperature limit. System 200 includes heat exchanger 204/204' for placing hydraulic fluid 212 in thermal communication with gas 214 at a location downstream of turbine outlet 220, after the gas temperature has been lowered by turbine 208. The relatively-cooler gas 214 will, therefore, extract thermal energy from fluid 212, thereby maintaining the fluid below any maximum allowable temperature limit. As shown in FIG. 2, heat exchanger 204 is located downstream of pump outlet 224. An alternate location is indicated by heat exchanger 204' located upstream of pump inlet 222. As will be appreciated by a person having ordinary skill in the art, there are advantages and disadvantages associated with both locations. For example, locating heat exchanger 204 downstream of pump outlet 224 requires the heat exchanger to be designed for higher pressure, which adds to the cost and complexity of the design, however, the efficiency of pump 210 may be greater due to the higher temperature and lower viscosity of fluid 212 at pump inlet 222. The opposite conditions exist when heat exchanger 204' is utilized—the cost and complexity of the heat exchanger is reduced due to the lower pressure, but the efficiency of pump 210 will also be reduced by the reduced temperature, higher viscosity of fluid 212 at pump inlet 222. In the example shown in FIG. 2, gas 214 is exhausted to atmosphere 236. In other examples, after passing through heat exchanger 204/204', gas 214 may be output to an enclosed volume having a pressure that is the same as, greater than, or less than, atmospheric pressure. System 200 also includes a relief valve 240 for diverting fluid 212 to pump inlet 222 rather than reservoir 230 when a pressure of the fluid in hydraulic circuit 206 exceeds a maximum allowable value.

In one example, turbine 208 is configured to have an inlet temperature between approximately 60° F. and approximately 500° F. and have a pressure ratio of between approximately 5 and 30 resulting in discharge temperatures that can range from −150 F to +200 F. In one example, hydraulic circuit 206 is designed to operate at a substantially constant pressure of between 1,000 psi and 3,500 psi and hydraulic fluid 212 and/or circuit 206 has a maximum allowable temperature of between approximately 90° F. and 500° F. In one example, pump 210 may have a best efficiency point (BEP) set at a flow rate of approximately 40 gpm and a speed of 100,000 rpm. In one example, pump 210 may be designed with a sufficient range to meet a flow rate of approximately 4 gpm to approximately 70 gpm at approximately 3,000 psi by adjusting the speed from approximately 92,000 rpm to approximately 115,000 rpm. In one example, the system may be designed to meet a 0.9-second response time to achieve 95% of a requested flow rate. In one example, no recirculation of the hydraulic fluid 212 is required to meet required flow demands; however a high-pressure relief valve, such as valve 240 and an inlet recirculation system may be included in the design for increased robustness. Examples of pressurized gas include air, hydrogen, natural gas, methane, carbon dioxide, or any other pressurized gas. Examples of hydraulic fluid include any type of hydraulic fluid, such as water, mineral oil, natural oil, such as rapeseed or canola oil, glycol, esters, organophosphate ester, polyalphaolefin, propylene glycol, and silicone oils, or any other type of liquid.

System 200 may also include a controller 250 for monitoring various operating parameters of the system, such as a pressure and temperature of hydraulic circuit 206, turbine 208 and pump 210 inlet and exit temperatures and pressures, shaft 404 (FIG. 4) speed, turbine power generation, and pump power consumption. Controller 250 may also control one or more of control valve 218 and relief valve 240 to maintain the system parameters within normal operating ranges. In one example, controller 250 may monitor pump 210 exit pressure and shaft 404 (FIG. 4) speed, and adjust a position of control valve 218 to meet the power demand of the pump to thereby maintain a substantially-constant pressure in hydraulic circuit 206 across a range of flow rates. Pump 210 may be designed to have sufficient pressure rise to shut-off, so that the flow rate is well defined through pump exit pressure and shaft speed alone.

In another embodiment, rather than control valve 218 and controller 250, system 200 may include a shut-off valve (not illustrated) located upstream of turbine 208 that opens and closes in response to pump 210 exit pressure, with the shut-off valve configured to be in an open position when pump exit pressure approaches a low value, e.g., approximately 2900 psi, and closes as the pump exit pressure approaches a high value, e.g., approximately 3300 psi. Such an approach could enable an all-mechanical system, which may also require a snubber or equivalent pressure damping system to smooth out pressure transients and spikes during cycling of the shut-off valve. An all-mechanical embodiment may also include a mechanical dampening system for providing compliance in the hydraulic system to smooth out the pressure response of hydraulic fluid 212 during on-off cycles of pump 210.

Figure 3:
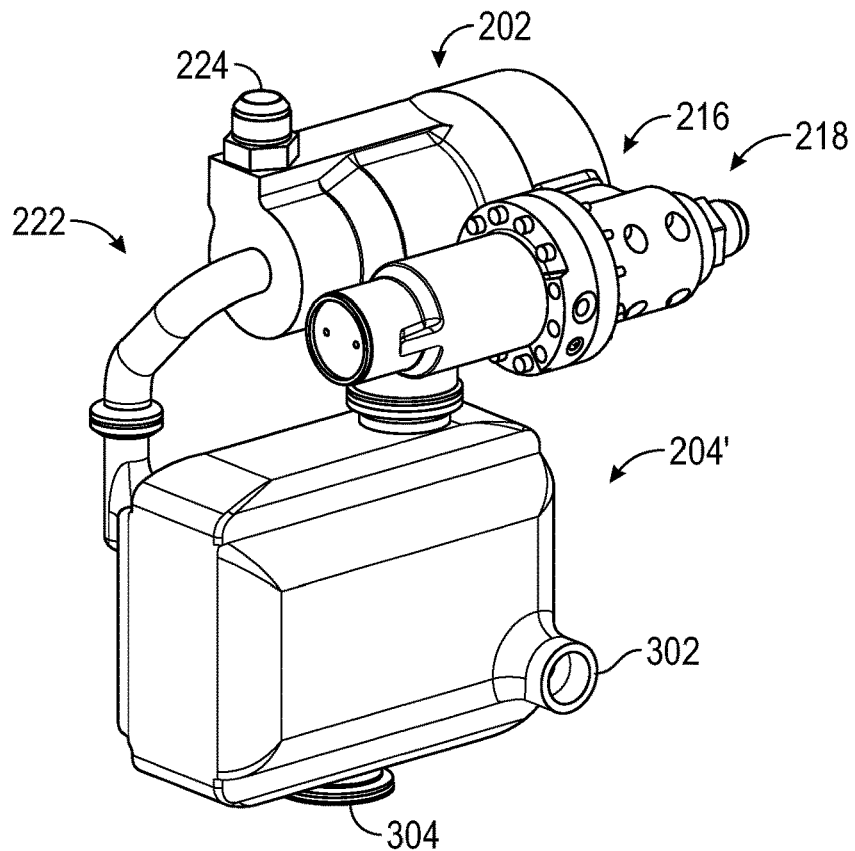
FIG. 3 is a perspective view of the turbo-pump, control valve, and heat exchanger of the system shown in FIG. 2.

FIG. 3 illustrates an example of turbo-pump 202, control valve 218, and heat exchanger 204'. In the illustrated example, the components can be arranged into a relatively small and compact unit. Example heat exchanger 204' is a cross flow plate-type heat exchanger and includes a hydraulic fluid inlet 302 for coupling to hydraulic circuit 206 and a gas discharge 304 for discharging gas 214 after extracting thermal energy from hydraulic fluid 212.

Figure 4:
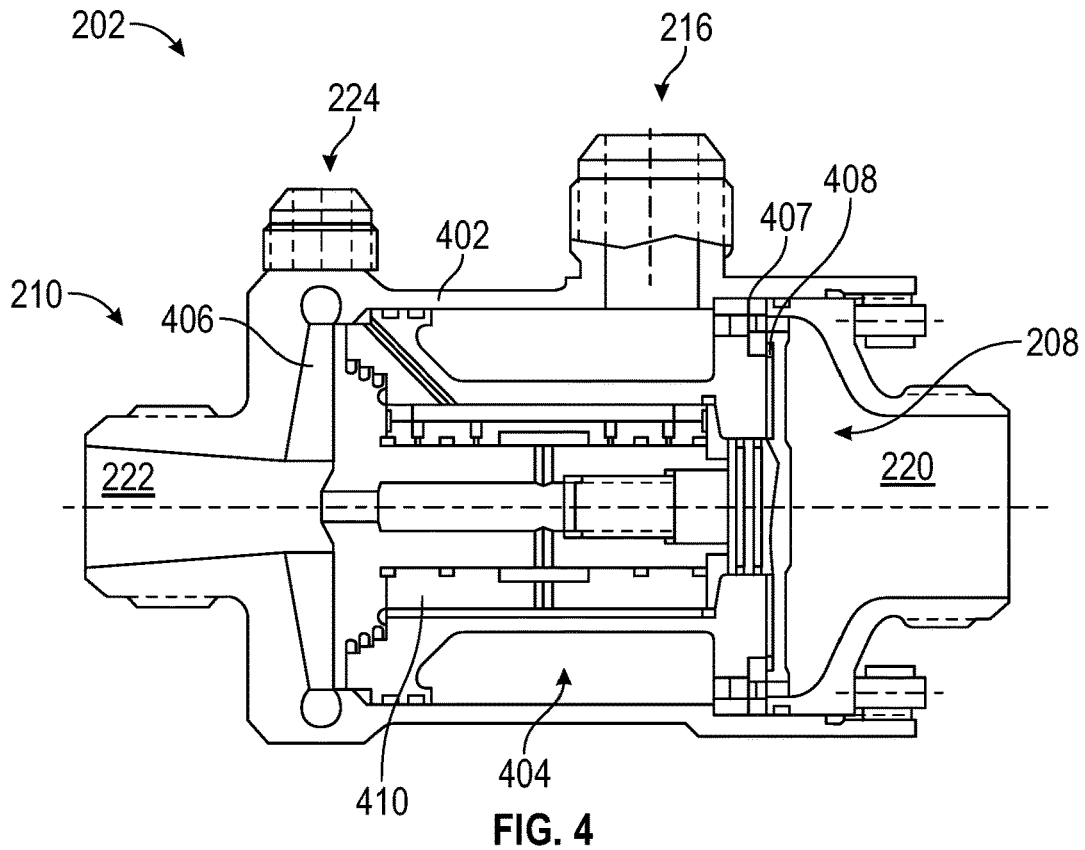
FIG. 4 is a cross sectional view of the turbo-pump of FIGS. 2 and 3.
Figure 5:
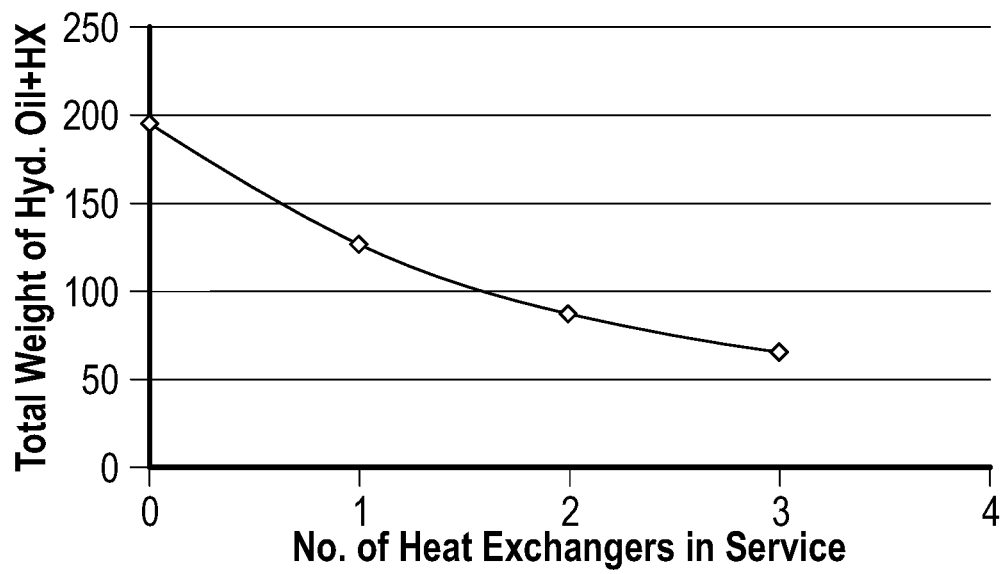
FIG. 5 is a graph of total weight of hydraulic fluid and heat exchangers as a function of a number of heat exchangers.
Figure 6:
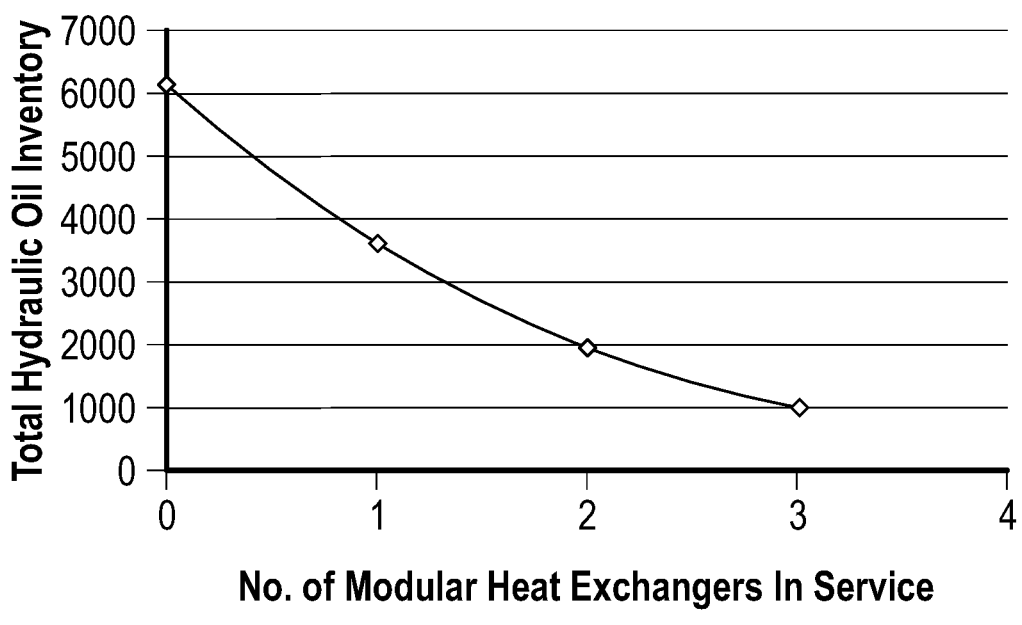
FIG. 6 is a graph of total volume of hydraulic fluid versus a number of heat exchangers.

FIG. 4 is a cross-sectional view of turbo-pump 202. As shown, turbine 208 and pump 210 are located in a common housing 402, and are mechanically coupled by shaft 404. In the illustrated example, pump 210 is a low specific speed centrifugal pump with a multi-stage centrifugal impeller 406. Turbine 208 is an axial drilled nozzle impulse turbine with a nozzle 407 and a single-stage axial rotor 408. Turbo-pump 202 also includes a hydrodynamic fluid bearing 410 to provide the necessary support of the high speed rotating turbine-pump shaft 404. In the illustrated example, bearing 410 utilizes hydraulic fluid 212 that is being pressurized by pump 210 and for which temperature must be limited to acceptable levels. FIGS. 5 and 6 graphically illustrate how incorporating one or more heat exchangers as shown in FIGS. 2 and 3 can reduce a total weight (FIG. 5) and volume (FIG. 6) of hydraulic fluid 212 required for hydraulic circuit 206. Data for FIGS. 5 and 6 are based on heat exchanger 204 (located downstream of pump outlet 224). FIG. 5 is a plot of the total weight of hydraulic fluid 212 and heat exchanger(s) 204 as a function of the number of heat exchangers. As shown in FIG. 5, although the addition of heat exchangers 204 adds weight to the system, a lower volume of hydraulic fluid 212 is required to maintain the fluid below a maximum allowable temperature. FIG. 5 shows that in the illustrated example, the weight reduction associated with the reduction in fluid 212 is greater than the additional weight of heat exchanger 204, thereby reducing the total weight of the system. FIG. 5 also shows that this trend continues as additional heat exchangers 204 are added to the system at least for the first three heat exchangers. FIG. 6 shows the corresponding total required volume of hydraulic fluid 212 as a function of the number of heat exchangers 204, with the total volume decreasing as the number of heat exchangers is increased.

As will be appreciated by a person having ordinary skill in the art, system 200 enables a reduction in the size, weight, and electrical power requirements of a hydraulic drive system such as hydraulic circuit 206 over conventional designs. For example, prior art hydraulic design systems may require an electrical pump for pumping the hydraulic fluid, an air, water, or refrigerant-based hydraulic fluid cooler for maintaining the fluid below a maximum temperature, and fluid reservoirs for containing a sufficient volume of the hydraulic fluid. By contrast, pump 210 utilizes the motive force of pressurized gas 214 rather than an electrical power source, and the cold outlet temperature of the gas at turbine outlet 220 is utilized with one or more compact heat exchangers to control the temperature of the fluid 212 rather than requiring another fluid source, such as air, water, or refrigerant, for cooling the hydraulic fluid. As will be appreciated, system 200 is shown merely by way of example and the present disclosure does not exclude the use of conventional system components such as one or more electric pumps, and/or air, fluid, or refrigerant coolers in combination with one or more features of the systems disclosed herein.

The addition of heat exchangers also increases the total space the system occupies, such that a space versus weight tradeoff exists as additional heat exchangers are added. Also, system 200 may be designed such that heat exchanger(s) 204/204' maintain fluid 212 below a maximum allowable temperature while not over-cooling the fluid. For example, in the case of heat exchanger 204' (located upstream of pump inlet 222), an over-cooling of fluid 212 can result in an unnecessary reduction in the efficiency of pump 210, and excessive cooling of fluid 212 can result in a viscosity of the fluid exceeding a maximum allowable value, which can result in pump cavitation. In some examples, a bypass (not illustrated) can be incorporated for bypassing hydraulic fluid 212 around heat exchanger 204/204' when the fluid temperature drops below a minimum value, to thereby avoid excessive cooling.

Figure 7:
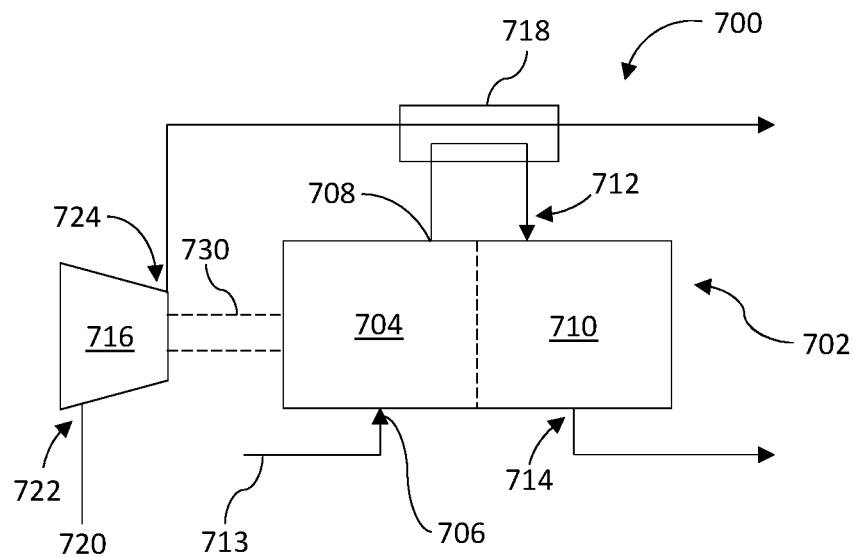
FIG. 7 is a diagram of an exemplary system made in accordance with the present disclosure.

FIG. 7 shows an example system 700, which is an application of system 100 applied to a multi-stage gas compressor 702. Compressor 702 includes a first stage 704 having an inlet 706 and an outlet 708 and a second stage 710 having an inlet 712 and an outlet 714. System 700 also includes a turbine 716 and intercooler 718. Intercooler 718 is in fluid communication with an inter-stage location of compressor 702, specifically, between first stage outlet 708 and second stage inlet 712 for reducing a temperature of a working fluid 713 being compressed prior to second stage 710, which can increase an efficiency of the second stage. As will be appreciated, in other embodiments, any number of compressor stages and associated intercoolers may be used. Turbine 716 is a non-combustion turbine and is configured to receive a pressurized gas 720 at inlet 722 and expand the gas and exhaust it at outlet 724 at a lower temperature and pressure. Intercooler 718 places gas 720 downstream of turbine outlet 724 in thermal communication with working fluid 713 downstream of first stage outlet 708. Turbine 716 is configured to exhaust gas 720 at a lower temperature than a temperature of working fluid 713 at first stage outlet 708, such that thermal energy is extracted from the working fluid, thereby reducing a temperature of the working fluid and increasing an efficiency of compressor 702.

System 700 can also optionally include a shaft 730 or other mechanical connection for mechanically coupling turbine 716 and compressor 702 so that the turbine can power the compressor. Thus, high pressure gas 720 can be used to both power compressor 702 via turbine 716 and also used to cool working fluid 713 to thereby increase compressor efficiency.

Figure 8:
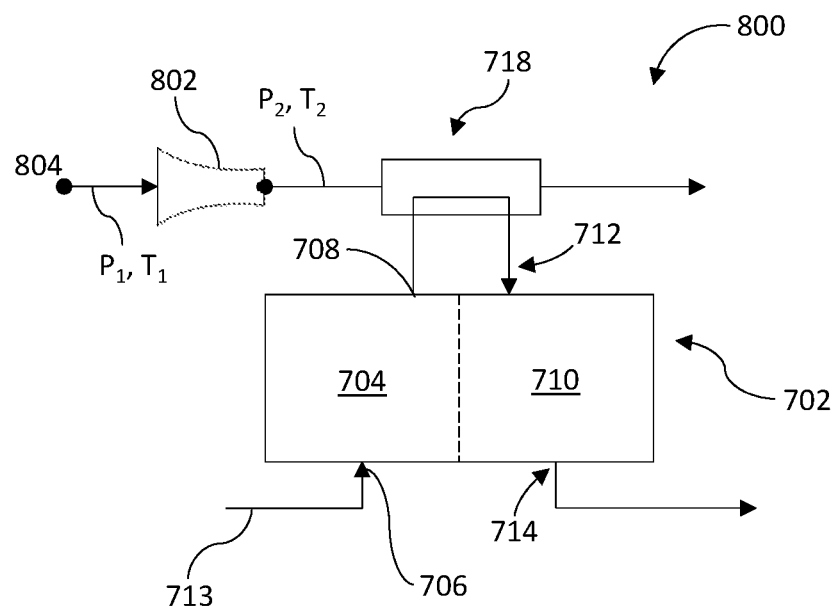
FIG. 8 is a diagram of an exemplary system made in accordance with the present disclosure.

FIG. 8 shows an alternate embodiment that includes a system 800 having compressor 702 and intercooler 718. Unlike system 700, however, system 800 utilizes a nozzle 802 rather than turbine 716 (FIG. 7) for expanding pressurized gas 804 from a first high pressure and temperature P1, T1, to a second lower pressure and temperature P2, T2. Intercooler places the lower temperature gas 804 in thermal communication with working fluid 713 to thereby cool the working fluid and increase the efficiency of compressor 702. As will be appreciated, systems 700 and 800 may be combined, for example, to include both turbine 716 and nozzle 802.

Any of the systems disclosed herein may be applied where a pressurized fluid is available for expansion and then use as a cooling fluid. For non-limiting example, systems disclosed herein can be utilized in applications where the pressure of a high pressure liquid or gas must be reduced for a downstream application, such as a pressure reduction station utilized in natural gas distribution systems, where the pressure of the gas is reduced for downstream usage. In such an application, a high pressure natural gas would correspond to first fluid 108 (FIG. 1), or pressurized gas 214 (FIG. 2), 720 (FIG. 7), or 804 (FIG. 8). In another non-limiting example, a portion of gas from a gas-powered, such as a natural gas powered, power generation or propulsion system for either a stationary apparatus, e.g., an industrial application, or a mobile apparatus, e.g., a vehicle, etc., may be utilized as the first fluid 108 (FIG. 1), or pressurized gas 214 (FIG. 2), 720 (FIG. 7), or 804 (FIG. 8). For example, a vehicle that includes a natural gas-powered propulsion system and one or more hydraulic drive systems may utilize system 200 (FIG. 2) for maintaining a temperature of the hydraulic fluid 212 (FIG. 2) within allowable limits. Such an approach can result in an appreciable reduction in the size and weight of the hydraulic drive system and significantly reduce or eliminate electrical power requirements for the hydraulic system, such as electric pump power requirements for pressurizing the hydraulic drive system.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A pumping system, comprising:
a turbo-pump that includes:
a housing;
a pump located in the housing and configured to pressurize a hydraulic fluid in a hydraulic circuit; and
an expander located in the housing and mechanically coupled to the pump, the expander configured to be coupled to a pressurized gas source located exteriorly of the housing for driving the pump;
the pumping system further comprising:
a heat exchanger coupled to an outlet of the expander and configured to be coupled to the hydraulic circuit for cooling the hydraulic fluid with the pressurized gas discharged from the expander; and
a valve disposed upstream of an inlet of the expander and configured to control the flow of the pressurized gas into the expander according to at least one of a pressure of the hydraulic fluid, a temperature of the hydraulic fluid, or a speed of the pump.

2. The pumping system of claim 1, wherein the pump and the expander are coupled by a shaft, the pumping system further including a hydrodynamic fluid bearing coupled to the shaft, wherein the bearing utilizes the hydraulic fluid from the hydraulic circuit as a bearing working fluid.

3. The pumping system of claim 2, wherein the pump is a centrifugal pump and the expander is an axial turbine.

4. The pumping system of claim 1, further comprising a bypass valve coupled to the hydraulic circuit and located upstream of the heat exchanger, wherein the bypass valve is configured to open when a temperature of the hydraulic fluid drops below a threshold value to thereby cause at least a portion of the hydraulic fluid to bypass the heat exchanger.

5. The pumping system of claim 1, wherein the hydraulic fluid is water, mineral oil, rapeseed oil, canola oil, glycol, ester oil, organophosphate oil, polyalphaolefin, propylene glycol, or a silicone oil.

6. The pumping system of claim 1, wherein the pressurized gas is air, hydrogen, natural gas, methane, nitrogen, or carbon dioxide.

7. The pumping system of claim 1, wherein the valve is configured to adjust a position of the valve to maintain the pressure of the hydraulic fluid at a substantially constant pressure, wherein the pressure is between 1,000 psi and 3,500 psi.

8. The pumping system of claim 1, wherein the expander is configured to be in an open loop system wherein the pressurized gas discharged from the expander does not return to the inlet of the expander.

9. A controller for a pumping system, the pumping system including:
a pump configured to pressurize a hydraulic fluid in a hydraulic circuit;
an expander mechanically coupled to the pump, the expander configured to be coupled to a pressurized gas source for powering the expander and the pump;
a heat exchanger coupled to an outlet of the expander and configured to be coupled to the hydraulic circuit for cooling the hydraulic fluid with the pressurized gas discharged from the expander;
a control valve disposed upstream of an inlet of the expander and configured to control the flow of the pressurized gas into the expander; and
a bypass valve coupled to the hydraulic circuit and located upstream of the heat exchanger for bypassing the heat exchanger;
wherein the controller is configured to perform operations comprising:
receiving a pressure value corresponding to a pressure of the hydraulic circuit;
controlling a position of the control valve according to the pressure value to maintain a substantially-constant pressure in the hydraulic circuit; and
opening the bypass valve in response to determining a temperature of the hydraulic fluid is below a threshold value to thereby cause at least a portion of the hydraulic fluid to bypass the heat exchanger.

10. The controller of claim 9, wherein the expander is coupled to the pump by a shaft, wherein the controller is further configured to receive a shaft speed value corresponding to a speed of the shaft, and wherein the step of controlling a position of the control valve includes controlling the position of the control valve according to the pressure value and the shaft speed value.

11. The controller of claim 9, wherein controller is further configured to receive a temperature value corresponding to the temperature of the hydraulic fluid, and wherein the step of controlling a position of the control valve includes controlling the position of the control valve according to the pressure value and the temperature value.

12. The controller of claim 9, wherein the expander is configured to be in an open loop system wherein the pressurized gas discharged from the expander does not return to the inlet of the expander.

13. A method of controlling a pressure of a hydraulic circuit with a pumping system, the pumping system including: a pump configured to pressurize a hydraulic fluid in the hydraulic circuit; an expander mechanically coupled to the pump, the expander configured to be coupled to a pressurized gas source for driving the pump; a heat exchanger coupled to an outlet of the expander and configured to be coupled to the hydraulic circuit for cooling the hydraulic fluid with the pressurized gas discharged from the expander; and a valve disposed at an inlet of the expander and configured to control the flow of the pressurized gas into the expander; the method comprising: receiving at least one of a pressure of the hydraulic fluid, a temperature of the hydraulic fluid, or a speed of the pump; adjusting a position of the valve according to the received pressure, temperature, or speed to thereby control a power output of the expander and pump to maintain the pressure of the hydraulic fluid at a substantially constant value; wherein the pumping system further comprises a bypass valve coupled to the hydraulic circuit and located upstream of the heat exchanger, the method further comprising opening the bypass valve in response to the temperature of the hydraulic fluid dropping below a threshold value to thereby cause at least a portion of the hydraulic fluid to bypass the heat exchanger.

14. The method of claim 13, wherein the hydraulic fluid is water, mineral oil, rapeseed oil, canola oil, glycol, ester oil, organophosphate oil, polyalphaolefin, propylene glycol, or a silicone oil.

15. The method of claim 13, wherein the pressurized gas is air, hydrogen, natural gas, methane, or carbon dioxide.

16. The method of claim 13, wherein the substantially constant value is between 1,000 psi and 3,500 psi.

17. The method of claim 13, wherein the expander is configured to be in an open loop system wherein the pressurized gas discharged from the expander does not return to the inlet of the expander.

* * * * *